US005501285A

United States Patent [19]
Lamine et al.

[11] Patent Number: 5,501,285
[45] Date of Patent: Mar. 26, 1996

[54] METHOD FOR CONTROLLING THE HEAD OF A DRILLING OR CORE-DRILLING DEVICE AND APPARATUS FOR CARRYING OUT THIS METHOD

[76] Inventors: Etienne Lamine, 74, Avenue du Ponte de Luttre, B-1190 Brussels, Belgium; Kees Langeveld, Volmerlaan 6, 2288 GB Rijswijk ZH, Netherlands

[21] Appl. No.: 276,137

[22] Filed: Jul. 18, 1994

[30] Foreign Application Priority Data

Jul. 20, 1993 [BE] Belgium ................. 09300768

[51] Int. Cl.⁶ ................................. E21B 47/00
[52] U.S. Cl. ................................. 175/27; 175/45
[58] Field of Search ................. 175/26–27, 38, 175/40–50

[56] References Cited

U.S. PATENT DOCUMENTS

| | | | |
|---|---|---|---|
| 4,372,398 | 2/1983 | Kuckes | 175/45 |
| 4,562,560 | 12/1985 | Kamp | 175/40 X |
| 4,570,480 | 2/1986 | Fontenot et al. | 175/48 X |
| 4,739,841 | 4/1988 | Das . | |
| 4,786,874 | 11/1988 | Grosso et al. . | |
| 4,905,774 | 3/1990 | Wittrisch . | |
| 4,907,658 | 3/1990 | Stangl et al. . | |
| 4,933,640 | 6/1990 | Kuckes | 175/45 X |
| 5,064,006 | 11/1991 | Waters et al. . | |
| 5,163,521 | 11/1992 | Pustanyk et al. . | |
| 5,220,963 | 6/1993 | Patton | 175/27 X |
| 5,230,386 | 7/1993 | Wu et al. . | |

OTHER PUBLICATIONS

Bit Whirl Identification by Experiment, S. L. Chen & M. Geradin LTAS, University of Liege, Mar., 1993.
Whirl and Chaotic Motion of Stabilized Drill Collars, J. D. Jansen, SPE, Jun. 1992 Koninklijke/Shell E&P Laboratorium, 1992.
Bit Whirl: A New Theory of PDC Bit Failure, J. F. Brett, T. M. Warren, and Amoco Production Co., SPE 19571.
Case Studies of the Bending Vibration and Whirling Motion of Drill Collars, J. K. Vandiver, J. W. Nicholson, Shell Development Co., & R. J. Shyu.

Primary Examiner—Michael Powell Buiz
Attorney, Agent, or Firm—Browning, Bushman, Anderson & Brookhart

[57] ABSTRACT

Electrodes are provided in a drill bit, or alternatively, in a coring bit, to measure variations in formation resistivity surrounding an earth borehole. Three orthoganal accelerometers are also provided in the drill bit, or in the coring bit, to monitor the dynamic behavior of the bit as functions of radial, axial and tangential accelerations.

35 Claims, 10 Drawing Sheets

METHOD FOR CONTROLLING THE HEAD OF A DRILLING OR CORE-DRILLING DEVICE AND APPARATUS FOR CARRYING OUT THIS METHOD

This invention relates to a method for controlling the head of a bore drilling or core-drilling device, particularly for to the oil-drilling industry.

In order to improve the conditions in which bore drilling or core-drilling is carried out, it is necessary to gather as much information as possible on the parameters of the environment to be bored and/or particularly about the behavior of the head of the device during drilling, the relative parameters of the above-mentioned environment being, for example, the following: type of formation encountered, composition of the mud during drilling, variations in the salinity of the mud during drilling, presence of oil, . . . , while the parameters regarding the drilling device relate essentially to the position of the head in relation to the sides of the bore and for example to variations in the speed of rotation and/or in the advance of said device as well as to shocks felt by said drilling device.

These parameters can be stored during a drilling operation and used subsequently either to analyze problems having occurred during a drilling operation, such as momentary slowing down of the speed of the head's penetration in the formations encountered, a wear of the head more rapid than expected, etc, or to take these parameters into account during drilling or core-drilling operations likely to be carried out under conditions similar to those experienced during the drilling operation that gave rise to these parameters.

These parameters can be also be transmitted to the surface while they are being obtained, in order to enable a direct control of the drilling device and thus optimize this control at every moment of the drilling operation.

To this effect, in the method in accordance with the invention, the electric resistance of the drilling fluid is measured, and the control is effected under the dependance of the measured value of this resistance.

The resistance measured is affected by such factors as the nature of the rock formation being drilled, the occurrence of a direct contact with the formation during the measurement, the composition of the mud varying as a function of the rocks encountered during the drilling, as compared to the mud prepared for drilling . . .

In one advantageous embodiment of the method according to the present invention, the resistance is measured adjacent to the above-mentioned head. In this way, information is obtained concerning the immediate environment in which the drilling head is working and from which information can thus be deduced, and in particular information regarding said head's wearing.

In a most advantageous embodiment of the present invention, the variations in rotational speed and/or the movement of the head are measured simultaneously with the measurement of the resistance, and the control is adjusted according to the resistance measurements combined with said measurements of the speed variations. The measurement of speed variations enables a knowledge of the dynamic behavior of the drilling device and thus allows an optimized control particularly by adapting the speed and force of drilling to the prevailing circumstances.

This invention also relates an apparatus for carrying out the method in accordance with the present invention.

According to the invention, this apparatus comprises a device adapted to measure the electric resistance between at least two separate locations in the above-mentioned environment.

In one advantageous embodiment of the invention, the apparatus incorporates at least one accelerometer, preferably located in the drilling head or in the core drilling head, and oriented along its radius in order to sense the radial accelerations. Other details and characteristics will become apparent from the secondary claims and from the description of the drawings appended to the present description and illustrating by means of non-limitative examples the method and one particular embodiment of the apparatus in accordance with the invention.

Figure 1:
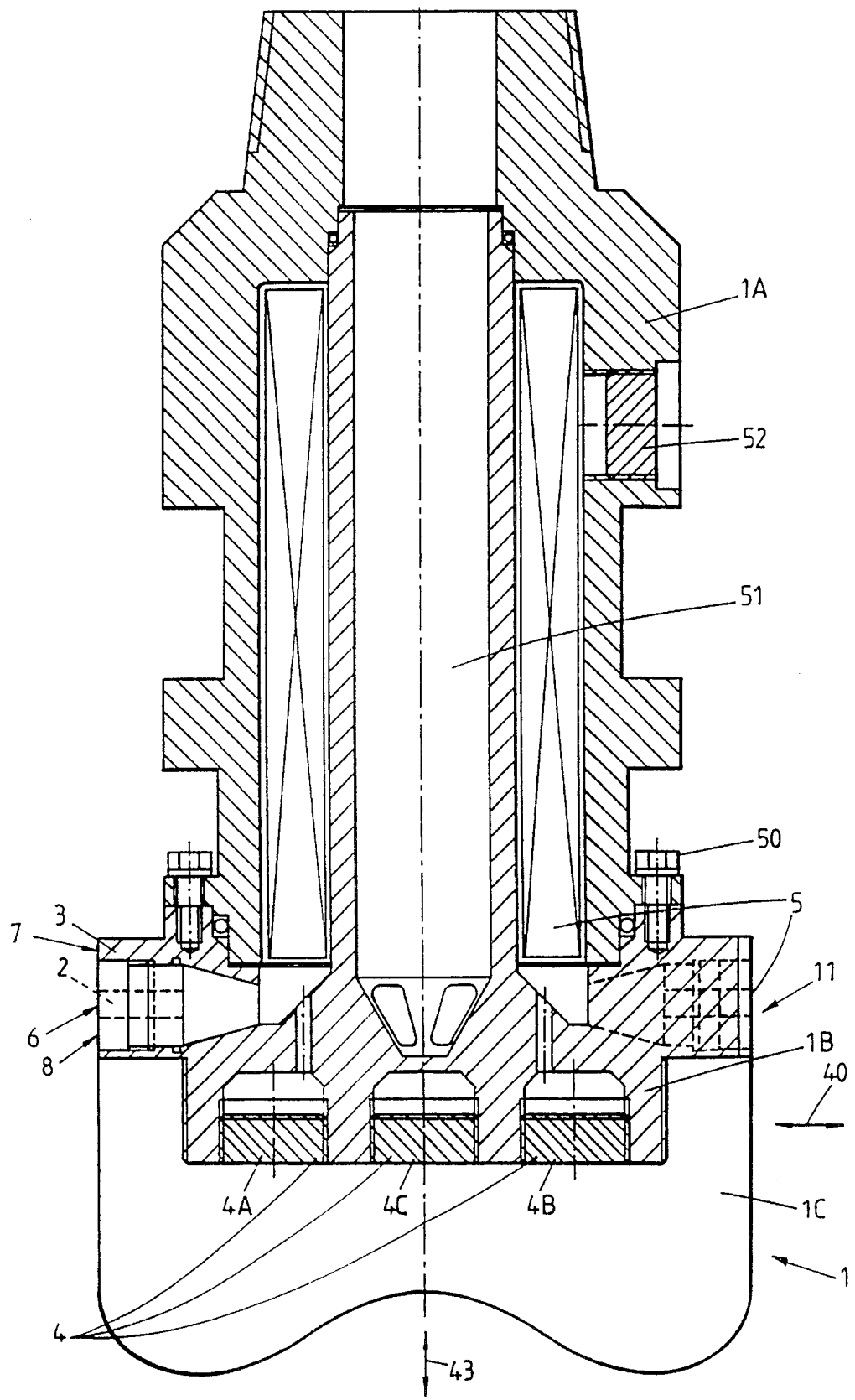
FIG. 1 shows an axial view of one type of drilling head equipped to measure resistance and acceleration

The method according to the invention is intended to control a drilling head as illustrated in FIG. 1. It may equally well be a core-drilling head, since a skilled craftsman could easily adapt the invention to the particular requirements of core-drilling. According to the invention, this method involves the steps of measuring the electrical resistance of the environment being drilled and of adjusting the controls according to the measured values of this electrical resistance.

The resistance measured depends on the resistivity (in ohms) of the elements where the measurement is carried out. For example, it has been determined that the usual muds for drilling or core-drilling in the oil-drilling industry generally have a resistivity of between 0.05 $\Omega$m and 1 $\Omega$m. In an oil-based mud, resistivity rises substantially to the infinite. The same is true if the measurement is carried out in contact with a rock formation that contains oil. On the other hand, during measurements by contact, rock formations usually give rise to a resistivity of between 0.1 $\Omega$m and 20 $\Omega$m, but this resistivity can be considerably higher in oil production areas, according to the amount of the oil contents in the formation.

It has been determined by mathematical modelling, and confirmed by experiments, that the relationship between the measured resistance R and the resistivity of the environment in which the measurement is carried out is a good approximation to the following equation:

$$R=\rho/8.a$$

where a is the radius of a circular surface of an element with a very high electrical conductivity, only the surface of the element being in contact with the 20 environment of resistivity $\rho$.

Figure 2:
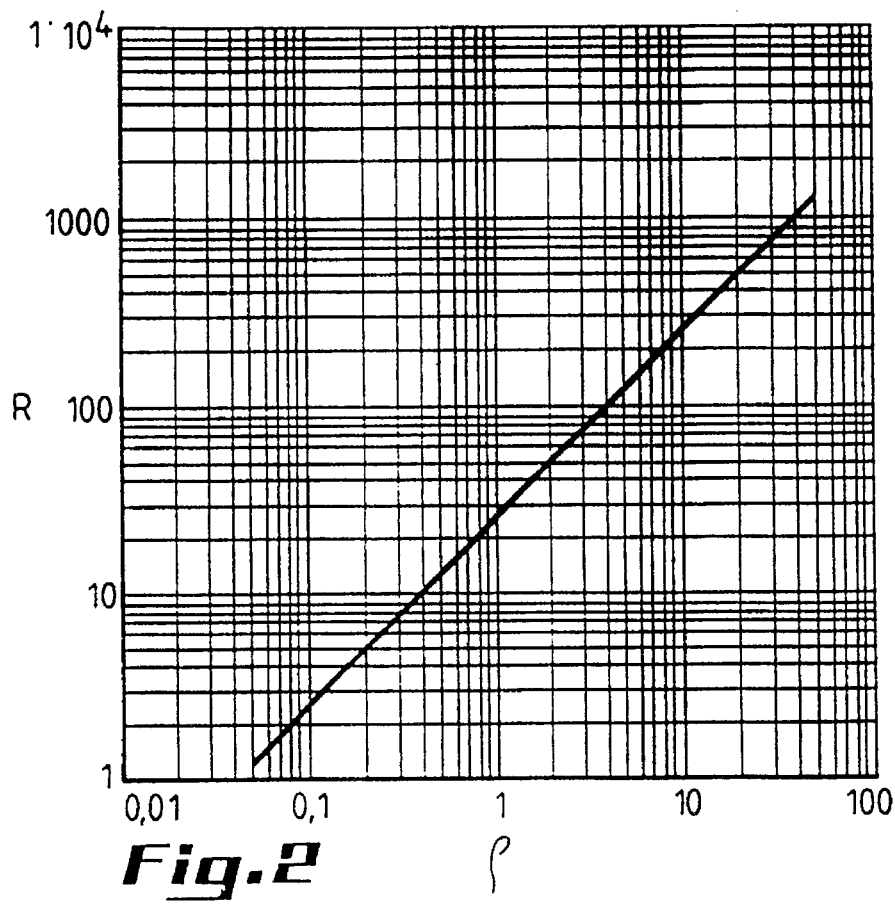
FIG. 2 is a graph illustrating the relationship between the measured resistance and the resistivity of the drilling fluid surrounding the head, or the resistivity of the rock formation, in contact with a circular electrode of a 5 mm radius.

FIG. 2 illustrates a logarithmic graph of the curve corresponding to this equation, if a=5 mm, R being expressed in $\Omega$ and $\rho$ in $\Omega$m.

The measurements of resistance can be transmitted to the operators of the drilling device so that they can adjust the control of the drilling device according to the environment encountered. As already explained above, this measurement of resistance can be recorded for subsequent use.

The measurement of the electric resistance R of the environment should preferably be carried out adjacent to the drilling head 1 so that the conditions encountered by this part, which constitutes the main part of the drilling device, may be known immediately.

The measurement of the resistance R is best carried out by an electrode 2 (FIGS. 1 and 2), e.g. an electrode fitted to the drilling head 1 so that it is electrically insulated from it and from the rest of the drilling device, on the one hand, and by the metallic mass 3 of the drilling device and thus of the head 1, on the other hand. To this effect, immediately around the electrode 2 metallic surfaces of the drilling device are provided, these metal surfaces being free from any sort of insulation that presents any electrical resistance.

In the same way, according to the invention the above-mentioned measurement of resistance R could be carried out between two electrodes similar to electrode 2 and arranged in a similar manner, the external metal surfaces of the drilling device located between the two electrodes and around said two electrodes being then preferably firmly covered with an electrical insulator such as to avoid any interference from the metallic mass 3 of said device with the measurement.

In addition, as will be explained later, several of the electrodes 2 (FIG. 4) may be provided distributed around the drilling device, the measurement of the resistance being thus carried out either between each of the electrodes 2 and the metal mass of the device or, according to one or more combinations, between each pair of the distributed electrodes 2.

According to another advantage of the invention, the variations in the speed of rotation and/or of the movement of the drilling head device itself can also be measured with at least one accelerometer 4, as explained in detail below, the combination of the resistance and acceleration measurements thus obtained being then used to adjust the above-mentioned control in order to gather teachings thus either optimizing the control of the bore-drilling while the measurements are being taken, and/or using these teachings during other, subsequent drilling operations.

Figure 9:
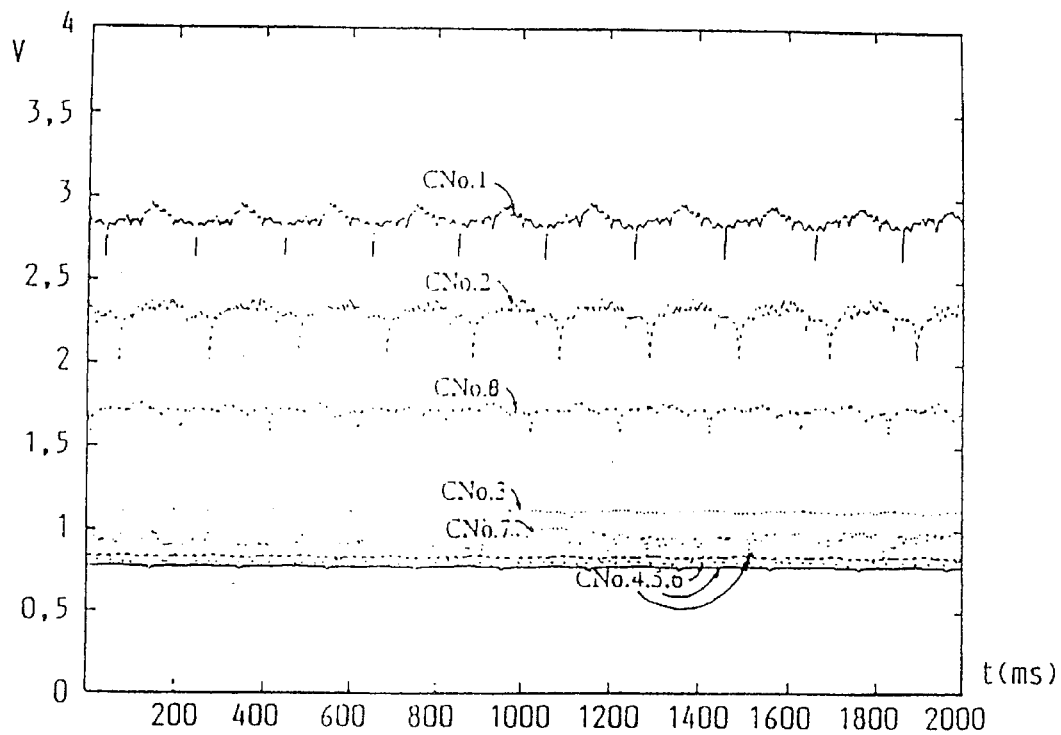
FIG. 9 is an example of readings of the voltage measured during drilling of a bore by a head equipped with 8 electrodes, as a function of time.
Figure 14:
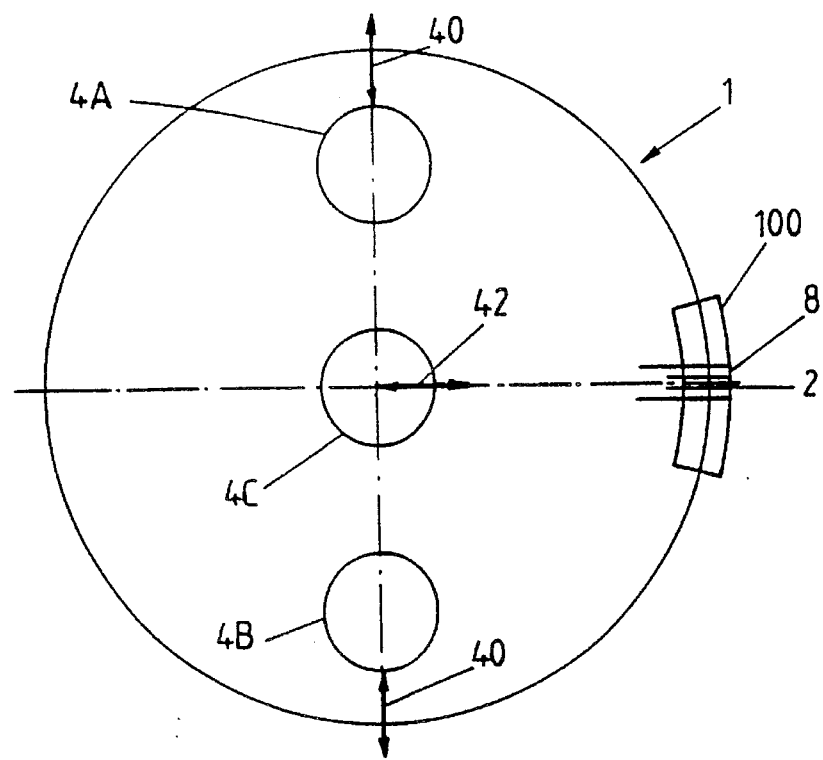
FIG. 14 represents a particular configuration, in transversal view, of a drilling head of the "cannon-fuse" type.
Figure 15:
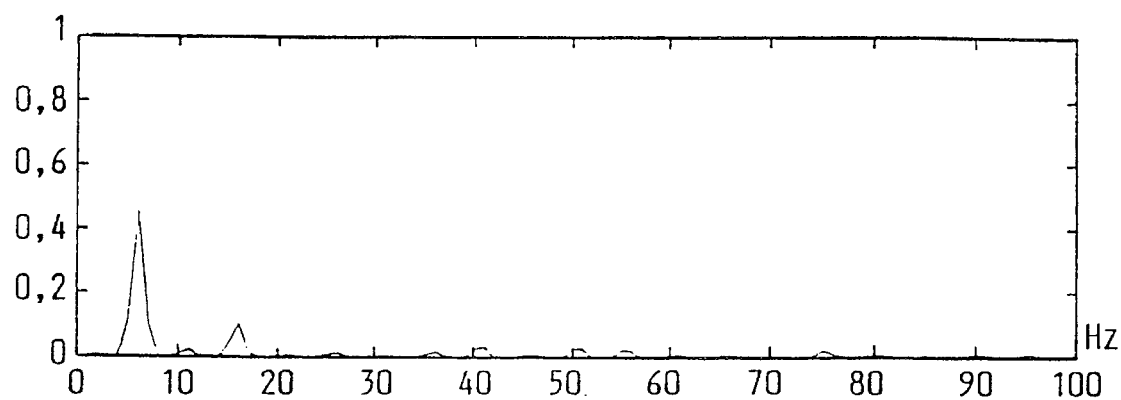
FIG. 15 is given for information purposes only, and is an analysis of the frequency spectrum (vertical axis) as a function of frequency (horizontal axis).

The method in accordance with the invention may advantageously comprise the treatment of the voltage measurements (V), and therefore of the resistance measurements R as a function of time for several electrodes 2. This results in a graph as shown in FIG. 9, which represents the curves corresponding to eight electrodes (curves CN01 to CN08). This graph shows the behavior of the head of a drilling device 1 in the shape of a "cannon-fuse" and schematically illustrated in FIG. 14. As shown in FIG. 14, the electrode 2 is arranged within the so-called "support-pad" or pad 100 of the head 1, this pad 100 resting almost permanently against the side of the bore being drilled.

The electrode 2, at a level with the outer surface of the pad 100, is virtually in contact with the formation being drilled and which offers an electrical resistance higher than that of the drilling fluid. The curve CN01 of FIG. 9 illustrates the variation of the voltage V between this electrode 2 in the pad 100 and the metallic mass of the head 1 during drilling. This variation of the voltage V depends on the more (top of the curve) or less (bottom of the curve) pronounced contact with the wall of the bore and thus depends on the greater or lesser amount of liquid present between the wall and the electrode 2.

The other curves CN02 to CN08 correspond to electrodes 2 distributed on the same level of the head 1, and around head 1, as the electrode 2 giving curve CN01. The electrodes 2 that give the curves CN02 and CN08 are situated on either side of the electrode which gives the curve CN01, etc. The electrode 2 which gives the curve CN05 is almost opposite that which gives the curve CN01 and almost always away from the wall of the bore, due to the action of the cutting force which pushes the pad 100 against the wall of the bore, and thus said electrode 2 away from said wall.

The treatment as a function of time of the measurements of resistance R can easily give the frequency of the impacts of the head 1 against the lateral side of the bore at the location of the electrode 2 and, through the combination of measurements carried out on several electrodes 2 distributed around the head 1, the frequency of rotation of the outer surface of head 1 against the wall of the bore being drilled.

Figure 10:
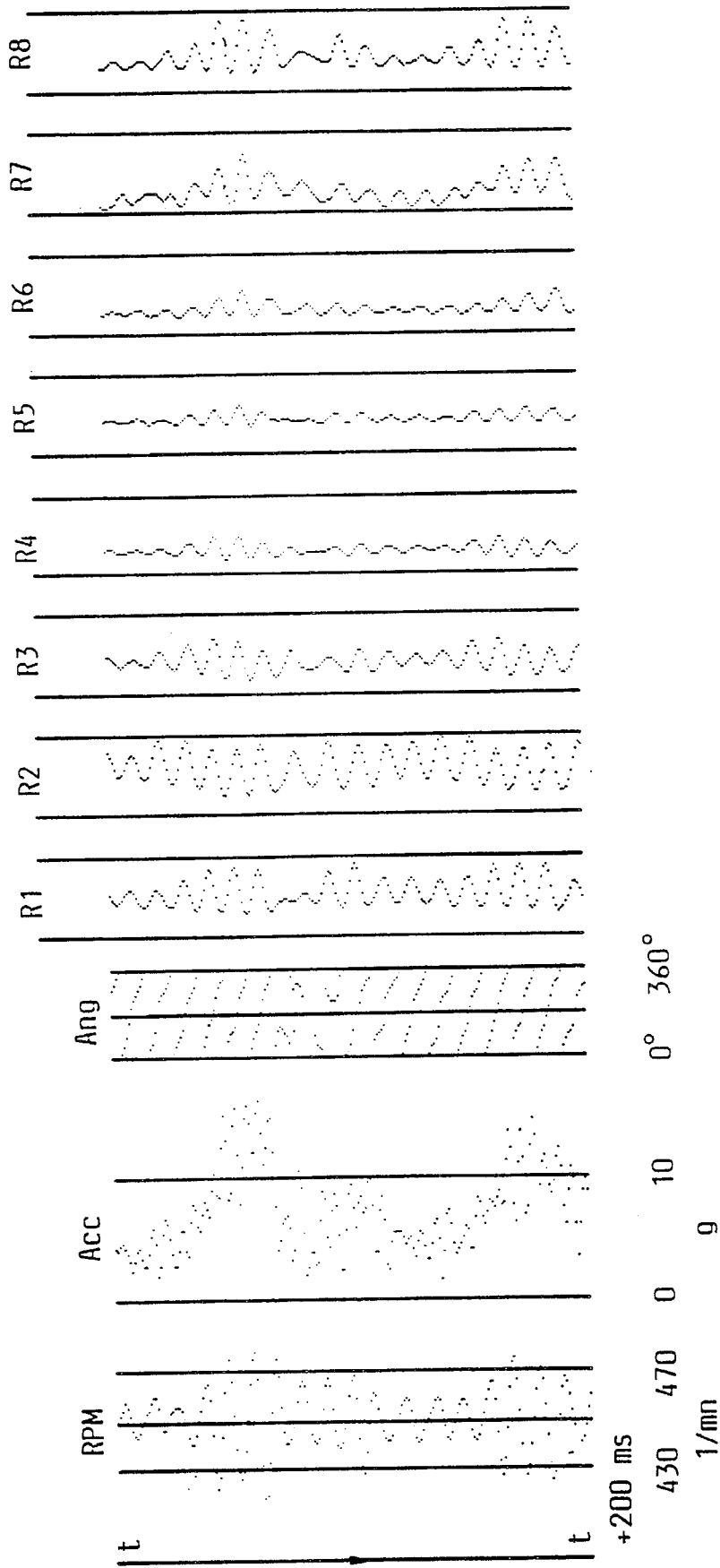
FIG. 10 is an example of readings of the simultaneous measurement of variations in the speed of rotation, accelerations, angular positions and resistance measurements by several electrodes, for a head during drilling, as a function of time.

FIG. 10 illustrate as a function of time (between t and t+200 ms) the rotational speed signals RPM from head 1, in revolutions per minute, (and in the fluctuation of this speed), the accelerometer signals ACC (from 0 to more than 10 G), the angular position ANG signals of the acceleration from head 1 in relationship with one reference position, and the resistance signals R1 to R8 from the 8 electrodes 2 evenly distributed on the outer circumference of head 1. FIG. 10 represents a drilling head or core-drilling head said to be instable.

Figure 11:
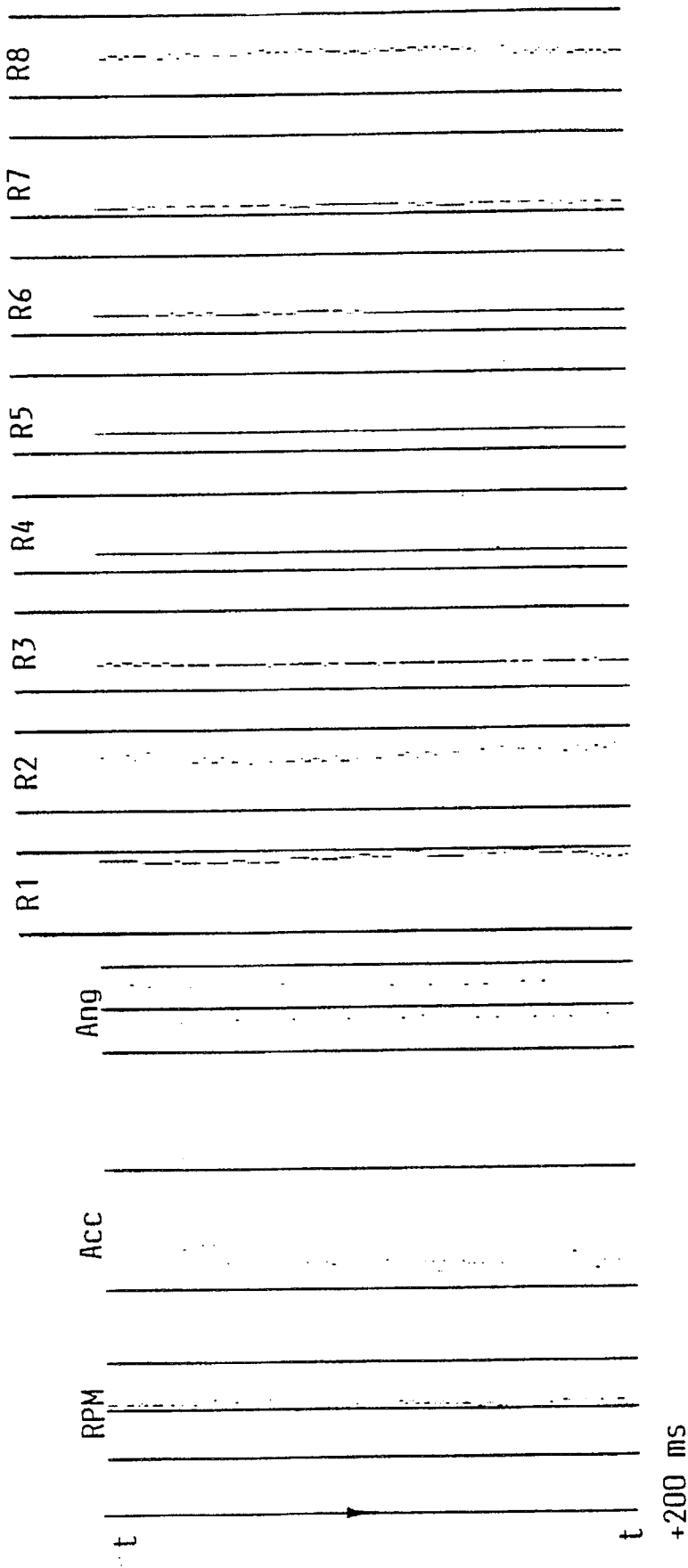
FIG. 11 is an example of readings corresponding to those of FIG. 10, for another head, during drilling.

FIG. 11 represents results corresponding to those of FIG. 10, but are related to a drilling head or core-drilling head 1 said to be stable.

For each moment of time, a treatment of the signals in FIG. 10 allows the determination of the spatial position of the head 1 in relation to the lateral side of the bore being drilled and the computation of the path followed by the center of this head 1.

Figure 12:
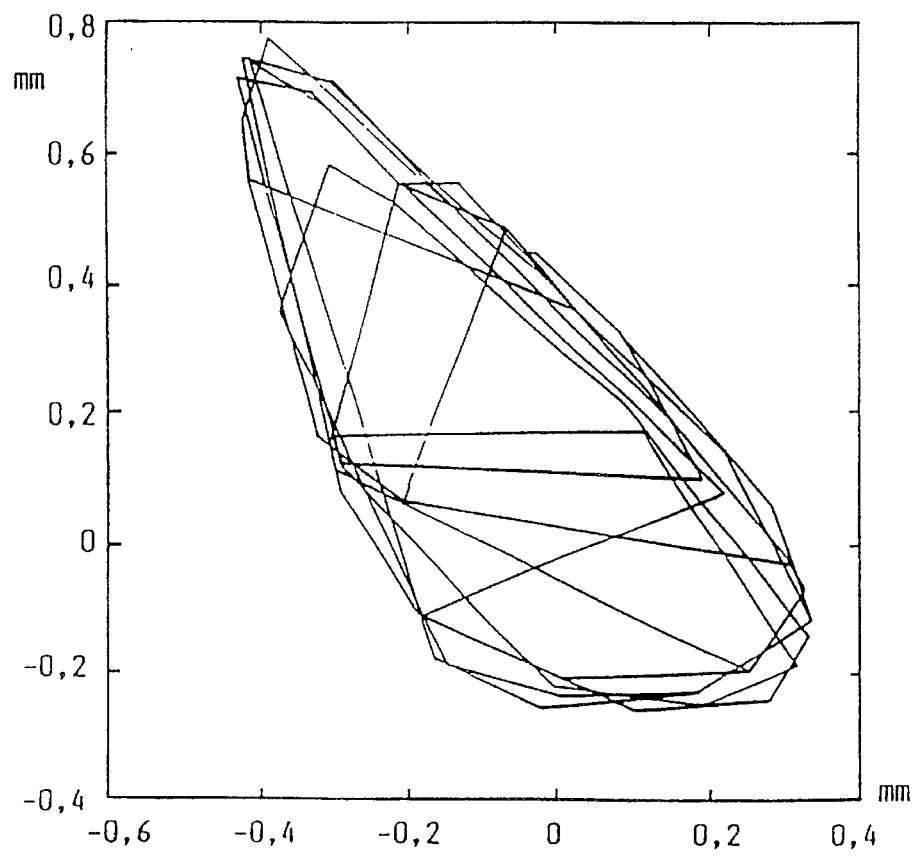
FIG. 12 represents an example of the path followed by the center of the head during drilling, during a determined period of time, in a plane passing through this center and perpendicular to the axis of a bore drilled by the head, the path being obtained from the resistance measurements by the electrodes, as in FIG. 4.
Figure 16:
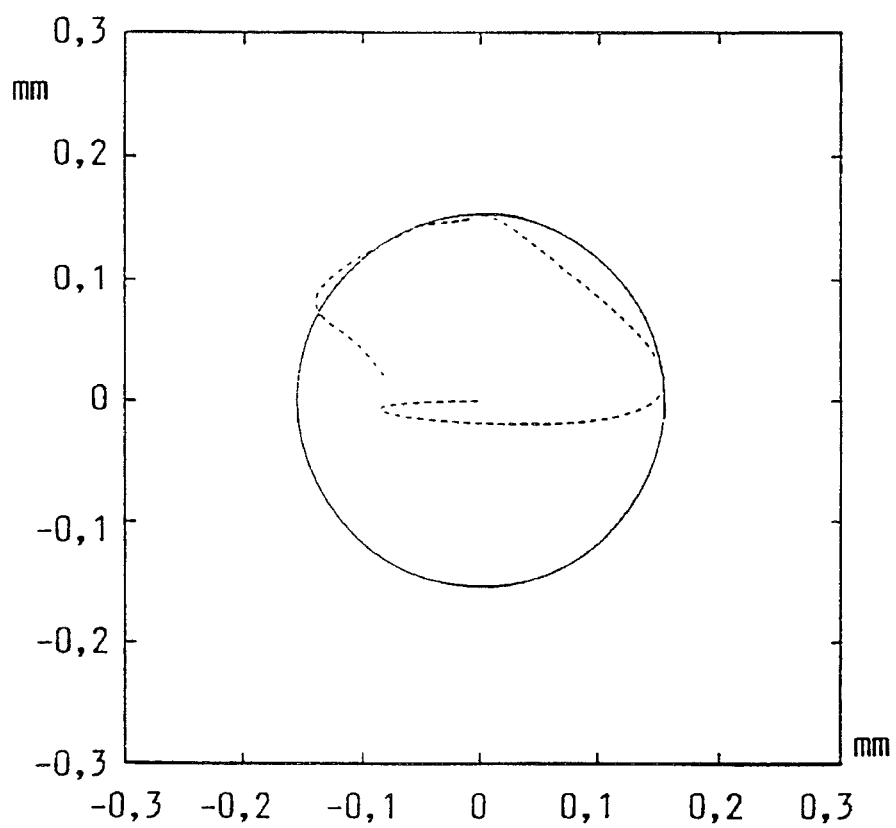
FIG. 16 illustrates on scale different from that of FIG. 12 a theoretical path (along a continuous line) of the center of the head and, for a determined period of time, an experimental path (in a broken line) obtained by double numerical integration of the head's acceleration as measured by the above-mentioned accelerometers.

Thus, the trajectory of the center of the head 1 (example in FIG. 16) can be found by means of a double numerical integration of the measured values of acceleration from one or several accelerometers 4. This trajectory can also be obtained (FIG. 12) by means of the calculations performed on the distances between the head 1 and the side of the bore being drilled, as measured simultaneously by several electrodes 2. The resistivity (or resistance R) is effectively linked to said distance by a hyperbolic function. This trajectory approximates an epicycloid followed by the rotation of the head 1 against said wall.

In addition, the orientation of the accelerometers 4A and 4B along a diameter of the head, on one hand, and of the accelerometer 4C perpendicular to this diameter, on the other hand, allows by frequential processing to determine the two angular speeds of rotation necessary to determine the characteristics of rotation along the above-mentioned epicycloid.

Figure 5:
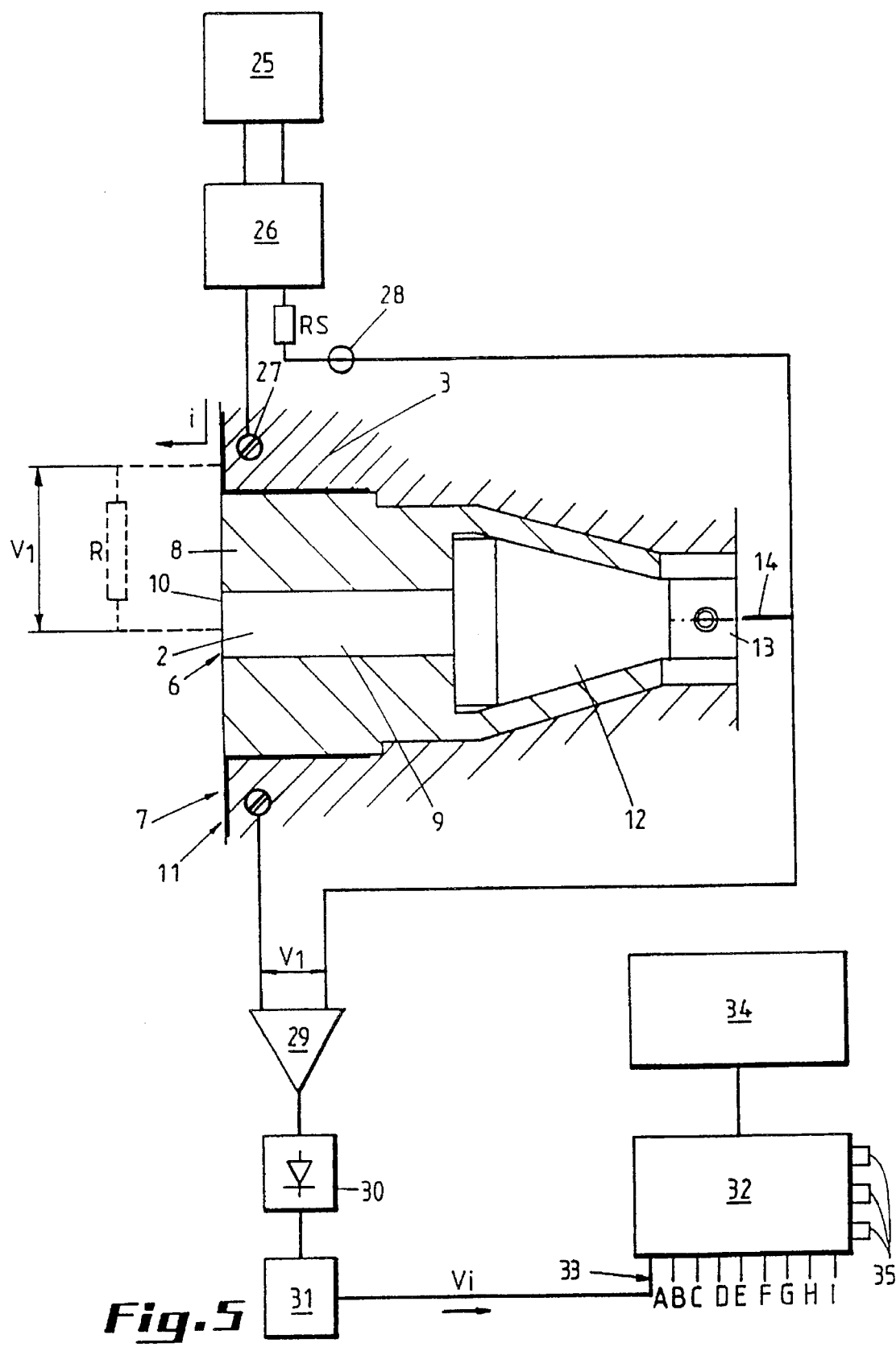
FIG. 5 illustrates a functional diagram of a device for the measurement and transmission of data on the resistance and acceleration according to the invention.

The apparatus for carrying out the method according to the invention comprises a device 5 (FIG. 1 and 5) arranged so as to measure the electrical resistance R between at least two distinct locations 6 and 7 of the environment in which the drilling is taking place. This measurement of resistance can be carried out at any location along the drilling (or core-drilling) device situated in the environment being drilled. Preferably, the two separate locations 6 and 7 are situated at the level of the head of the drilling device, as shown in the embodiment of FIG. 1.

According to another advantage of the invention, the measuring device 5 (FIGS. 3 and 5) includes an electrode 2 which is electrically insulated from the apparatus, by an insulator 8. According the present example, the electrode 2 comprises a cylindrical segment 9 whose longitudinal axis is arranged in the head 1 along a radius of the head, the free end face 10 of which being perpendicular to this radius and at a level with the external circumference 11 of the head 1, such as to constitute the measurement location 6. At the end opposite to the free end face 10, the cylindrical segment 9 is prolonged by a portion 12 of tapered and cylindrical parts coaxial to segment 9. At the end 13 opposite to segment 9, the electrode 2 comprises a connection lead 14.

Figure 3:
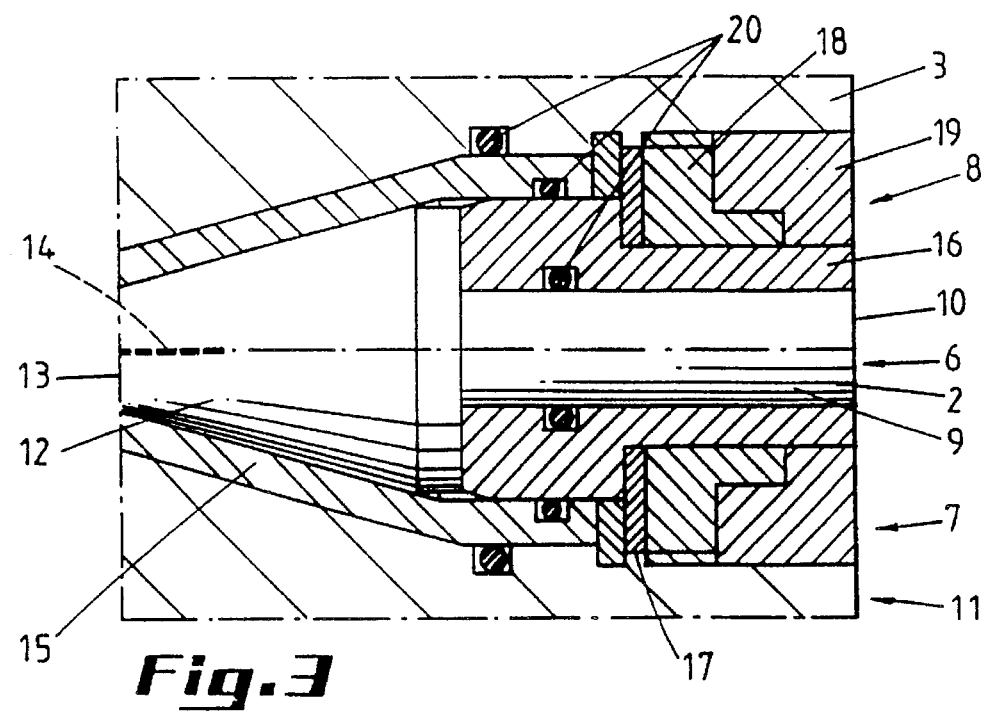
FIG. 3 illustrates on an enlarged scale an axial view of an electrode used in measuring the above-mentioned resistance.

According to FIG. 3, the insulator 8, made of standard insulating material or materials, can also be composed of an insulating sleeve 15, one part of said sleeve being adapted to the tapered portion 12 of the electrode 2 and to an appropriate housing in head 1, and a cylindrical part of said sleeve acting as the center of a layered socket 16 that supports a washer 17 (of the Belleville type) in order to press against each other the corresponding tapered surfaces and a layered ring 18 with external thread screwed into a corresponding thread in head 1. The screwing of the ting into head 1 ensures the precise positioning of electrode 2 and of the insulation sleeve 15 in head 1. A seal for the housing of the electrode 2, at a level with the external surface 11, can be achieved by means of a resin 19 being poured in and then allowed to cure.

Only the above-mentioned face of the free end 10 of the electrode, free from any insulating material, constitutes thus the measuring location 6, while the other measuring location 7 is formed by the metallic mass 3 of the apparatus, free of insulating material, in contact with the environment where the drilling is taking place. Three waterproof seals 10 are included to prevent any penetration of drilling fluid along the electrode 2 or the insulator 8.

The outer peripheral surface 11 around the insulator 8, constitutes also advantageously the measuring location 7 and is therefore kept exposed in order to be in contact with the environment being drilled.

The positioning of the free end 10 at a level with the outer peripheral surface 11 not only provides a simultaneous contact of this free end 10 and the peripheral surface 11 with the drilling fluid, but also with the formations where the drilling is being carried out.

Figure 13:
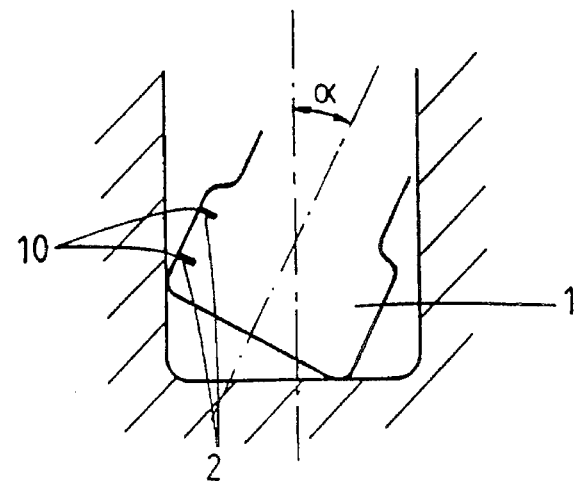
FIG. 13 is a schematic representation, in elevation, of a drilling head in which two electrodes are arranged so that their longitudinal axes are located in the same plane as the axis of the said head.

Two electrodes 2 can be arranged (FIG. 13) on the side wall of the drilling head (or core-drilling head) 1, on a line parallel to the axis of revolution of the head, so that their free ends 10 are on a plane parallel to the axis of head 1. A resistance measurement at the location of the two electrodes 2 can give after computation an indication of the angle of inclination o of the head 1 in relation to the lateral side of the bore being drilled.

Figure 4:
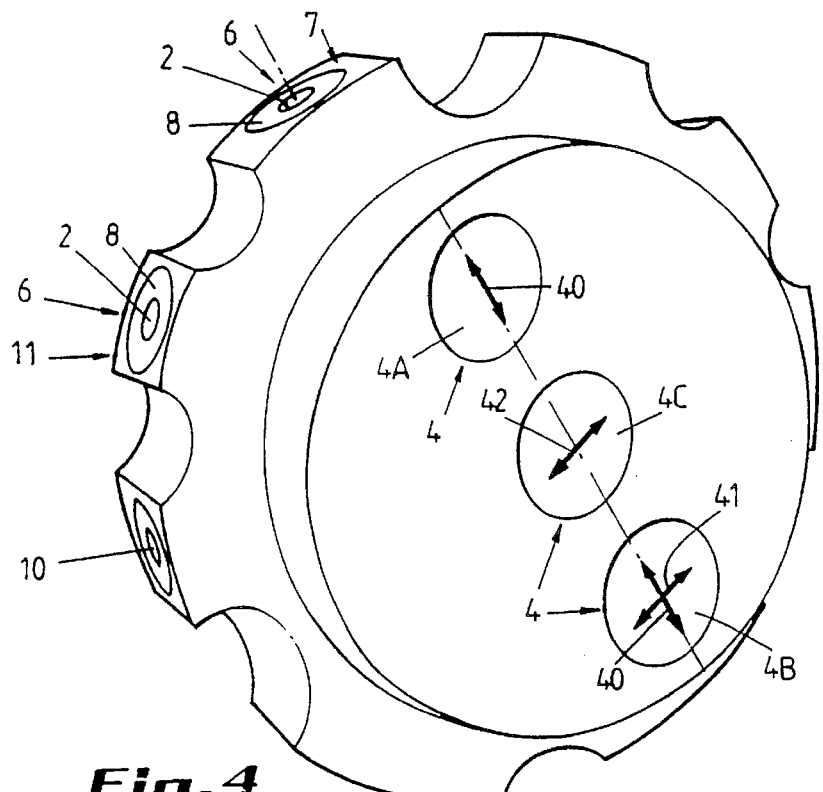
FIG. 4 illustrates on another scale a perspective view of an element of the drilling head, adapted to accommodate several electrodes and three accelerometers.

Several electrodes 2 are preferably distributed around the circumference of the head 2, as shown in FIG. 4, the longitudinal axes of the electrodes 2 lying substantially in the same plane perpendicular to the longitudinal axis of head 1. These electrode 2A can be used to measure the resistance R simultaneously in several places, each time between the electrode 2 and the metallic mass 3 of the outer peripheral surface 11. In addition, location 6A can be used as the end face 10 of an electrode 2, and location 7A as the end face 10A of another electrode 2A, for example adjacent to electrode 2. Other arrangements of electrodes 12 around head 1 and other locations 6 and 7 for the measurement of resistance R are also included in the scope of the present invention.

For the measurement of resistance R (FIG. 5) the measuring device 5 is constituted for example of batteries 25 delivering a continuous current to a current converter 26 which generates for the measurement an alternating current 1 at its output terminals 27, 28, so as not to polarize the measuring locations 6,7. The alternating current 1 preferably has a square form with a frequency of 1 kHz, so that the measurement is not affected by the speed of rotation of the drilling head.

For example, the output terminal 27 is connected to the metallic mass 3, and the output terminal 28 to the electrode 2.

The output terminals 27 and 28 are also connected to the input of a differential amplifier 29 whose output is connected serially to a rectifier 30 and a filter 31. The output of the filter 31 is connected to the input terminal 33A of a data collection system 32 comprising a microprocessor, an analogue/digital converter, a memory and a module adapted for coding data before transmission. The output from the data collection system 32 is connected to a transmission device 34.

The transmission device 34 can be adapted to transmit as soon as they are taken the measurements of resistance R, to a control station (not shown) in the apparatus in question. The transmission device 34 can also be adapted to store the measurements and transmit them only later, for example after withdrawal of the head 1 from the drilled bore.

The data delivered by the electrodes 2 and/or by the accelerometers 4 can be processed locally by the microprocessor in order to sort the information taken from the data, so as to avoid storage and/or transmission of all the signals which are recorded at a great speed and which have no further use.

Figure 6:
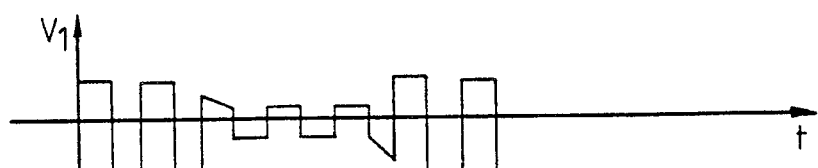
FIG. 6 is a theoretical graph of the voltage measured as a function of time between an electrode and the metal mass of the apparatus in contact with the drilling fluid, for a given alternating current flowing along this measurement path.
Figure 7:
FIG. 7 is a graph corresponding to FIG. 6 and illustrating the above-mentioned voltage after treatment by a differential amplifier, a rectifying device and a filter.
Figure 8:
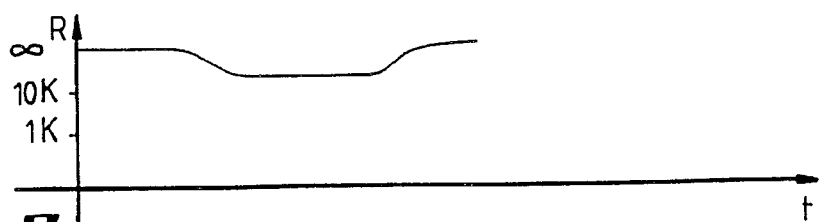
FIG. 8 is a graph corresponding to the two preceding graphs and simultaneously representing the measured resistance.

The current i flowing through electrode 2 and the metallic mass 3 in the environment being drilled meets an electric resistance R which creates a potential difference V1 between the metallic mass 3 and the electrode 2 (FIG. 6). This potential difference C 1, after treatment by the differential amplifier 29, generates at the output of said operational amplifier a voltage which, after processing by the rectifier 30 and the filter 31, delivers a voltage V1 (FIG. 7) proportional to the measured resistance R (FIG. 8), this resistance R being almost infinite when there is no contact between the measurement locations 6, 7 and a conductive environment.

The apparatus in accordance with the invention comprises also advantageously the accelerometers 4 (FIG. 1 and 4). Each of these accelerometers 4 can either be monoaxial, biaxial or triaxial, according to whether it is sensitive to accelerations along one, two or three mutually orthogonal directions. Thus, accelerometer 4A is monoaxial and is adapted to sense radial accelerations along direction 40 passing by the axis of head 1. Accelerometer 4B is biaxial and adapted to sense radial accelerations along the same direction 40 and tangential accelerations along direction 41. Accelerometer 4C is a biaxial accelerometer adapted to sense radial accelerations of head 1 along direction 42 and axial accelerations of head 1 along direction 43.

The accelerometers 4 are arranged on the same diameter of head 1, perpendicular to the axis of said head, so that the accelerometers 4A and 4B lie at the same distance from the axis of head 1. The accelerometer 4C is arranged on the axis of head 1.

The accelerometer 4B may be triaxial and measure accelcrations in all three directions 40, 41 and 43 (the measurement along this direction could then no longer be carried out by accelerometer 4C). As shown in FIG. 1, the head 1 can comprise three coaxial elements:

- a hollow body 1A forming among others the housing for the measuring device 5 and arranged to be fixed along the rods (not illustrated)
- an insert part 1 B which is fixed into the body of a 1A and held there by screws 50, the measuring device being arranged in an annular space between the body 11 and the insert part 1B, a pipe 51 for the drilling fluid being provided in the axis of pipe 51, which comprises also threaded housings for the accelerometers 4 and threaded housings for the electrodes 2 (passageways for the connection leads for the measuring elements are visible in FIG. 1 ),
- a cutting edge 1C for the drilling itself.

Watertight joints are provided so that the drilling fluid can only flow along the rod towards the cutting edge 1 C and so that it cannot, among others, get into the annular space provided for the measuring device 5.

A stop 52 (FIG. 1) allows access to the measuring device 5, for example in order to calibrate it, to charge the batteries, to collect the measurements, etc.

Returning to FIG. 5, terminals 33B and 33J, similar to terminal 33A, are provided as an example for other electrodes 2 distributed on the head 1. In addition, the data collection system 32 can be equipped with other input terminals 35 provided to receive the signals from the three accelerometers 4 and it is adapted according to the type of said accelerometers in order to process the signals.

It must be understood that the invention is in no way limited to the kind of embodiment herein described and that many modifications can be made without departing from the scope of the present invention.

Thus in the case of a drilling head set up in the manner of a "cannon-fuse" (illustrated in FIG. 14), it may be possible to provide only one electrode 2 situated on the level of the pad 100 of the head, this pad being located substantially in the direction of the resultant of the cutting force of this head 1.

Figure 17:
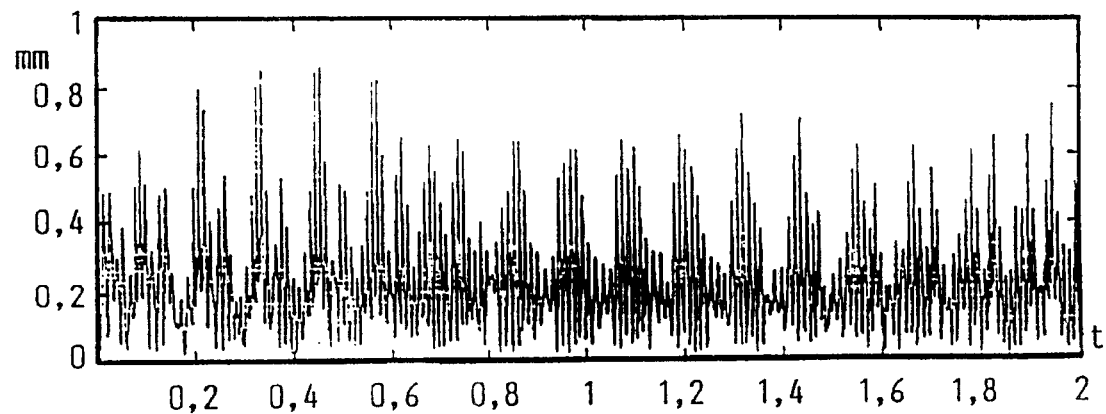
FIG. 17 is a graph showing as a function of time, as derived from the signals from the electrodes, the development of the gap between the instant center of a bore while being drilled and the center of the head drilling the bore and equipped according to the invention.
Figure 18:
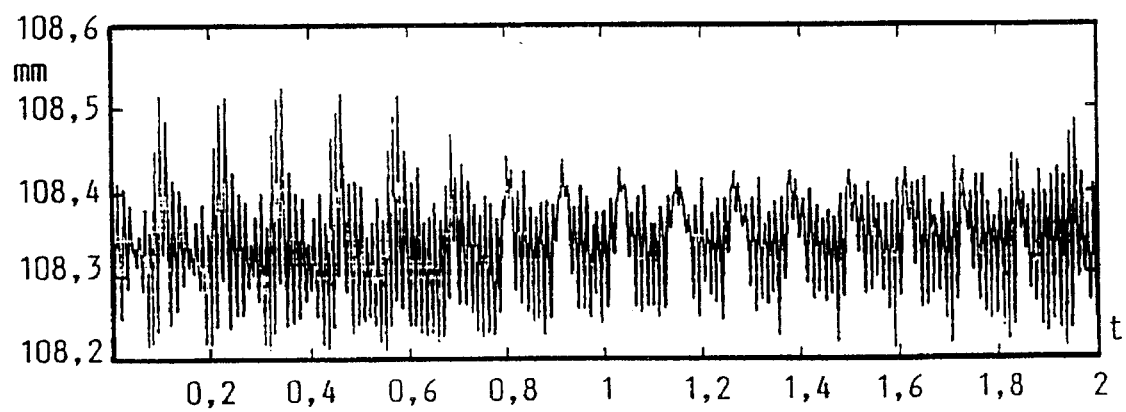
FIG. 18 is a graph showing, as a function of time and as derived from the signals from the electrodes, the development of the actual radius of the bore being drilled with a head of a nominal diameter of 8½", i.e. a nominal radius of 107.9 min.

The invention therefore offers means of measuring the resistance R of the environment where the drilling is taking place, means of measuring the various accelerations experienced by the head 1 during drilling and means of determining the dynamic behavior of the head 1 and its position in relation to the side of the well being drilled, from which the excentricy curves of head 1 in relation to the well being drilled may be deduced (FIG. 17). A measurement of the actual radius of the well being drilled can also be obtained using the invention (FIG. 18).

What is claimed:

1. A measuring system for a drill bit for measuring a parameter related to movement of at least a portion said drill bit, said drill bit being secured to the end of a drill string and being operable for drilling a borehole through a formation, said drill string and said borehole forming a fluid flow path for circulating fluid through said drill string and said borehole, said apparatus comprising:

a bit body for said drill bit, said bit body having a fluid bore extending therethrough such that said fluid flow path extends through said fluid bore, said bit body having a sensor mount disposed therein;

at least one cutter edge mounted to said bit body for cutting into said formation to a tubular shank portion extending from said bit body and having a top connector for connecting to said drill string;

a movement sensor affixed to said sensor mount in said bit body, said movement sensor being responsive to a parameter related to movement of said drill bit for producing an electrical signal;

an electrical conductor for electrically conducting said electrical sensor signal; and a data collection system operable for receiving said electrical sensor signal.

2. The measuring system of claim 1, wherein said movement sensor is responsive to electrical resistivity adjacent said drill bit in said borehole.

3. The measuring system of claim 2, wherein:

said movement sensor is affixed along a radius of said drill bit and is oriented to sense radial acceleration of said drill bit along said radius.

4. The measuring system of claim 1, wherein:

said movement sensor is mounted at a position on said drill bit offset from an axis of said drill bit to sense tangential accelerations with respect to a radius said drill bit.

5. The measuring system of claim 1, wherein:

said movement sensor is oriented to sense axial accelerations, with respect to an axis of said drill bit.

6. The measuring system of claim 1, wherein said movement sensor further comprises:

a plurality of resistivity sensors circumferentially spaced around said bit.

7. The measuring system of claim 1, wherein:

said movement sensor is operable to measure acceleration in at least two directions orthogonal to each other, said movement sensor being mounted to measure acceleration in at least one direction along a radius of said drill bit.

8. The measuring system of claim 1, further comprising:
a removable portion of said drill bit, said sensor mount being disposed in said removable portion.

9. The measuring system of claim 1, wherein said movement sensor is mounted so as to be substantially flush with a gauge diameter of said drill bit.

10. The measurement system of claim 1, wherein said movement sensor further comprises:
first and second movement sensors, said first movement sensor being responsive to electrical resistivity, said second movement sensor being responsive to inertia.

11. The measuring system of claim 1, further comprising a voltage supply for supplying a voltage to an outer surface of said movement sensor.

12. A method for measuring a physical parameter related to a drill bit, said drill bit having a cutter mounted thereon for drilling a borehole through a formation, said drill string and said borehole forming a fluid flow path, said method comprising the steps of:
fastening a sensor to said drill bit;
threadably connecting a tubular shank of said drill bit to the end of said drill string, said threaded connector of said tubular shank encircling said fluid flow path;
rotating said drill bit to drill said borehole through said formation;
pumping fluid through said drill bit along said fluid flow path;
detecting said physical parameter with said sensor;
producing an electrical signal in response to said step of detecting; and
conducting said electrical signal through a cable.

13. The method of claim 12, wherein said step of detecting said physical parameter further comprises:
detecting an electrical property adjacent said drill bit.

14. The method of claim 13, further comprising:
determining variations in instantaneous rotational speed of said drill bit from said electrical property.

15. The method of claim 13, further comprising:
determining radial movement of said drill bit from said electrical property.

16. The method of claim 13, further comprising:
determining a borehole caliper of said drill bit from said electrical property.

17. The method of claim 13, further comprising:
determining levels of vibration of said drill bit associated with high drill bit wear from said electrical property.

18. The method of claim 17, further comprising:
controlling drilling to reduce said levels of vibration.

19. The method of claim 13, further comprising:
determining a frequency of impact of said drill bit against a side of said borehole from said detected electrical property.

20. The method of claim 12, wherein said step of detecting further comprises:
detecting a plurality of electrical resistances at spaced positions on said drill bit.

21. The method of claim 20, further comprising:
determining an apparent formation resistivity from a distribution formed by said plurality of electrical resistances.

22. The method of claim 20, further comprising:
determining bit instability from said plurality of electrical resistances.

23. The method of claim 20, further comprising:
controlling drilling to reduce said bit instability.

24. The method of claim 20, determining a lateral trajectory of a bit axis with respect to a borehole axis.

25. The method of claim 12, further comprising:
detecting acceleration of said drill bit.

26. The method of claim 25, further comprising:
determining an approximate diameter of said borehole from said detected acceleration.

27. The method of claim 25, further comprising:
determining motion of said drill bit from said detected acceleration.

28. The method of claim 12, further comprising:
detecting resistance at vertically spaced positions on said drill bit.

29. The method of claim 28, further comprising:
determining tilt of said drill bit.

30. The method of claim 12, further comprising:
storing a plurality of signals in a data collection system.

31. The method of claim 30, further comprising:
retrieving said bit; and
retrieving said plurality of stored signals.

32. The method of claim 30, further comprising:
controlling drilling in response to said plurality of signals.

33. The method of claim 12, further comprising:
detecting acceleration with an accelerometer sensor mounted internally with respect to an outer surface of said drill bit.

34. The method of claim 12, wherein said step of fastening a sensor to said drill bit further comprises:
mounting said sensor to a removable portion of said drill bit.

35. The method of claim 34, further comprising:
retrieving said drill bit from said borehole; and
unfastening said removable portion of said drill bit from said drill bit body.

* * * * *

UNITED STATES PATENT AND TRADEMARK OFFICE
CERTIFICATE OF CORRECTION

PATENT NO. : 5,501,285
DATED : March 26, 1996
INVENTOR(S) : Etienne Lamine and Kees Langeveld It is certified that error appears in the above-indentified patent and that said Letters Patent is hereby corrected as shown below:

In column 8, line 30, after "formation to" insert --form said borehole;--

Signed and Sealed this

Twenty-sixth Day of August, 1997

Attest:

BRUCE LEHMAN

Attesting Officer

Commissioner of Patents and Trademarks